United States Patent Office 3,383,395
Patented May 14, 1968

3,383,395
STABILIZATION OF ORGANIC MATERIALS
WITH BIPHENYLTRIOLS
Seymour Schmukler, Dalton, Mass., assignor to General
Electric Company, a corporation of New York
No Drawing. Filed Mar. 3, 1965, Ser. No. 436,958
9 Claims. (Cl. 260—398.5)

ABSTRACT OF THE DISCLOSURE

As a new compound, 3,3',5,5' tetra-substituted-2,4,4'-trihydroxybiphenyl and a process for its formation comprising reaction of an alcohol with a 3,3',5,5'-tetra substituted -2,4,4'-triacetoxybiphenyl.

---

This invention relates to novel diphenyl compounds and to a process for their preparation. More particularly, the invention relates to novel 3,3',5,5'-tetra-substituted-2,4,4'-trihydroxybiphenyl compounds formed by reacting an alcohol with a 3,3',5,5'-tetra-substituted 2,4,4'-triacetoxybiphenyl.

The tetra-substituted trihydroxybiphenyls of this invention are useful for a wide variety of applications. They find utility as starting materials for other potentially useful compounds. For example, they may be reacted with epichlorohydrin to form triglycidyl ethers useful for the formation of epoxy resins. Such reactions are disclosed and claimed in my copending U.S. patent application Ser. No. 442,813, filed Mar. 25, 1965. The tetra-substituted trihydroxybiphenyls may also be used as curing agents, modifying agents, etc.

In addition to the above, the tetra-substituted trihydroxybiphenyls of this invention have unexpectedly effective antioxidant properties. This is particularly surprising as many very similar tetra-substituted dihydroxybiphenyls are not as effective antioxidants as the compounds of this invention.

The tetra-substituted trihydroxybiphenyls with which this invention is concerned may be represented by the following general formula:

I
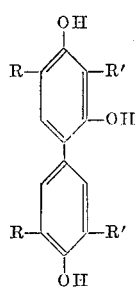

wherein R and R' are monovalent hydrocarbons having up to 15 carbon atoms such as alkyl, including cycloalkyl, e.g., methyl, ethyl, propyl, isopropyl, butyl, isobutyl, cyclobutyl, amyl, cyclopentyl, hexyl, cyclohexyl, methylcyclohexyl, ethylcyclohexyl, octyl, decyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc.

The expression "tetra-substituted trihydroxybiphenyl" as used throughout this disclosure and in the claims will refer to compounds having the general formula represented in Formula I above.

The novel compounds of my invention are prepared by reacting an acidified alcohol with a triacetoxybiphenyl compound having the following general formula:

II
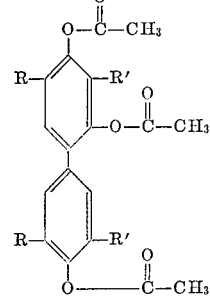

wherein R and R' have the same meaning as in Formula I. Although this is the preferred method, other methods of cleaving acetates to free phenols, which are obvious to one skilled in the art, may be used; e.g., hydrolysis in the presence of an acid or base catalyst.

The compounds represented in Formula II are derived from a phenol. A diphenoquinone can be formed by an oxidative coupling reaction involving a phenol and a copper-tertiary amine complex catalyst in a manner disclosed and claimed in U.S. Patent No. 3,306,875, included herein by reference. In turn, the tetra-substituted diphenoquinone can be reacted with excess acetic anhydride in the presence of a small amount of sulphuric acid to give the triacetoxybiphenyl. Details for this reaction can be found in an article by G. H. Erdtmann, Proceedings of the Royal Society, London, volume 143, pp. 177–191, 1933.

The tetra-substituted trihydroxybiphenyl of this invention can be formed from the triacetoxybiphenyl by reaction with a lower alkyl alcohol such as methanol. Theoretically, 3 moles of alcohol will be needed for each mole of triacetoxybiphenyl, but I have found that it is necessary to have a large excess of alcohol i.e., 5–20 times the stoichiometric amount needed for the reaction. By performing the reaction in this manner, no additional solvent is needed as the alkyl alcohol serves as the solvent for the reaction mixture. Any inorganic acid may be used to acidify the alcohol. Typical examples of suitable acids include hydrochloric, sulfuric, phosphoric, etc. The preferred acid is hydrochloric. The quantity of acid employed is not critical and may vary between 0.01 and 3.0 moles per mole of triacetate.

The reaction between the triacetoxybiphenyl and the alcohol is believed to be a cleavage type reaction. The alcohol reacts with the acetate moiety to form an alkyl acetate. The reaction is reversible and the alkyl acetate generated by the reaction should be removed continuously as it is formed. The alkyl acetate may be removed by continuous distillation of the reaction mixture. This necessitates the addition of fresh alcohol to replace that removed with the alkyl acetate.

The reaction is preferably carried out at atmospheric pressure and in an atmosphere non-reactive to the reactants. The atmosphere may be supplied by blanketing the reaction with an inert gas such as helium, argon, nitrogen, etc.

The reaction is complete and may be discontinued when alkyl acetate is no longer generated.

As stated above, the tetra-substituted trihydroxybiphenyls of this invention are highly effective antioxidants. What is indeed surprising is that the trihydroxy compounds of this invention are much more effective as antioxidants than the dihydroxy compounds heretofore employed as antioxidants.

In British Patent 687,293 and U.S. Patent No. 2,479,-943, various tetra alkyl dihydroxybiphenyl compounds are disclosed as possessing valuable antioxidant properties. I have found that the trihydroxy compounds of this invention are even more effective antioxidants than the compounds of the two above mentioned patents. For example, the antioxidant effectiveness of 3,3',5,5'-tetramethyl-2,4,4'-trihydroxybiphenyl was compared to that of 3,3',5,5'-tetramethyl-4,4'-dihydroxybiphenyl in a manner described in the examples. It was found that a safflower oil methyl ester containing the dihydroxybiphenyl absorbed a given quantity of oxygen in almost one half the time required by the same safflower oil containing the trihydroxybiphenyl.

The compounds of my invention are effective antioxidants for about the same general class of material as any of the other well known phenolic antioxidants. Thus, the compounds of my invention find utility as antioxidants with most organic materials which are subject to oxygen decay. These organic materials include, but are not limited to, petroleum products—i.e., gasolines, motor oils, etc.; plastic compositions such as epoxy resins; fatty oils; lubricating oils; organic chemicals subject to oxidative attack such as aldehydes and ethers, etc. It is not necessary to employ large quantities of antioxidant to obtain effective protection and the quantity employed normally may vary between 0.01–2.0% by weight.

The following examples are illustrative of the method of preparing the novel compounds of my invention and also of the antioxidant effectiveness of these compounds.

EXAMPLE 1

A solution was formed by adding 100 g. of 3,3',5,5'-tetramethyldiphenoquinone in small portions to 600 ml. of acetic anhydride and 6 ml. of concentrated sulfuric acid with constant stirring. The reaction temperature was maintained between 40–50° C. throughout the addition of the acetic anhydride. Thereafter, the reaction mixture was cooled to room temperature, filtered to remove some solid gray material present in the reaction vessel and then slowly poured with constant stirring into 1,000 ml. of water. At first, it appeared that an oily material was formed, but as stirring continued, this oily material crystallized into a solid precipitate which settled to the bottom of the vessel. This solid was filtered off and washed thoroughly with water to remove any acid present. The product was then dissolved in methyl alcohol and recrystallized to give a pure product weighing 121.4 g. This material had a melting point of 140–142° C. and was analyzed as follows:

Calculated for $C_{22}H_{24}O_6$; C, 68.8; H, 6.3. Found: C, 68.6; H, 6.4.

The following two examples illustrate the reaction of a triacetoxybiphenyl with an alcohol to produce the trihydroxybiphenyl.

EXAMPLE 2

In this example, 5 g. of the triacetoxytetramethyldiphenyl of Example 1 were added to a mixture of 1 ml. of hydrochloric acid in 30 ml. of methanol. The resulting solution was heated to the boiling point of the methanol and refluxed for two and three-quarter hours. Throughout the refluxing period, a stream of nitrogen was bubbled through the reaction vessel. All of the solid was dissolved during reflux. At the end of the refluxing period, methanol and methyl acetate were distilled off under reduced pressure leaving a white solid. This solid was washed with water until acid free and then dried in a vacuum desiccator at 100° C. The product of this reaction melted at 237°–238° C. and was subsequently analyzed and determined to be 3,3',5,5'-tetramethyl-2,4,4'-trihydroxybiphenyl.

EXAMPLE 3

In this example, a mixture was prepared comprising 45 ml. of hydrochloric acid, 1,800 ml. of methanol and 297.2 g. of 3,3',5,5'-tetramethyl-2,4,4'-triacetoxybiphenyl. A continuous stream of nitrogen was passed over the reaction vessel. The reaction mixture was heated to boiling and methyl acetate generated by the reaction was continuously distilled off at atmospheric pressure. During the reaction period, the level of the reaction vessel was kept constant by the continuous addition of fresh methanol. When the distillate no longer had the odor of methyl acetate, the solution was concentrated to one-half of its volume. The concentrated solution was allowed to cool and poured into 6,000 ml. of water. A white solid formed which was filtered off. The filter cake was washed several times with water and dried in a vacuum desiccator at 100° C. The final product weighed 199.2 g. This was 99.8 percent of the theoretical yield. An analysis of the product indicated that it consisted of 3,3',5,5'-tetramethyl-2,4,4'-trihydroxybiphenyl.

EXAMPLE 4

This example compares 3,3',5,5'-tetramethyl-2,4,4'-trihydroxybiphenyl with prior art related anti-oxidants.

The samples compared were 3,3',5,5'-tetramethyl-4,4'-dihydroxybiphenyl, the 3,3',5,5'-tetramethyl-2,4,4'-trihydroxybiphenyl of Example 2, a 3,3',5,5'-tetramethyl bisphenol A, and bis-(2-hydroxy-3-methylphenyl)-methane. The samples were tested by forming a solution of each of the above mentioned antioxidants in ethanol. Thereafter, each solution was added to a sample of a distilled safflower oil methyl ester. Enough antioxidant solution was added to give a final concentration of 0.2% by weight antioxidant in the methyl ester. The ethanol was removed by evaporation using a rotating evaporator under vacuum. Thereafter, each of the four samples and a control sample comprising the methyl ester without antioxidant, was placed in testing bombs and oxygen added until a pressure of 100 p.s.i.g. was obtained. When the oxygen was added, the bomb was heated to 100° C. The time was measured for the various samples to absorb 82 millimoles/kg. as determined by a drop in gauge pressure. This period of time was defined as the induction period. The following results were obtained:

TABLE I.—STABILIZING EFFECT OF VARIOUS ANTIOXIDANTS ON SAFFLOWER OIL

| Sample: | Induction period (minutes) Test I |
|---|---|
| Control | 8 |
| 3,3',5,5'-tetramethyl-4,4'-dihydroxybiphenyl | 163 |
| 3,3',5,5'-tetramethyl-2,4,4'-trihydroxybiphenyl | 250 |
| 3,3',5,5'-tetramethylbisphenol A | 98 |
| Bis-(2-hydroxy-3-methylphenyl)methane | 69 |

As can be seen from the above data, the tetramethyl-trihydroxybiphenyls are superior to any of the other antioxidants compared and were almost twice as effective as the next best antioxidant.

EXAMPLE 5

The test of Example 4 was repeated twice more. The same reactants and procedures were employed. The results obtained are depicted in Table II below:

TABLE II.—STABILIZING EFFECT OF VARIOUS ANTIOXIDANTS ON SAFFLOWER OIL

| Sample | Induction Period (Minutes) | |
|---|---|---|
| | Test II | Test III |
| Control | 10 | 10 |
| 3,3',5,5'-tetramethyl-4 4'-dihydroxybiphenyl | 141 | 170 |
| 3,3',5,5'-tetramethyl-2,4,4'-4', trihydroxybiphenyl | 282 | 301 |
| 3,3',5,5'-tetramethylbis-phenol A | 100 | 111 |
| Bis-(2,Hydroxy-3-methylphenyl)-methane | 64 | 81 |

The foregoing disclosure of this invention is not to be considered as limiting, since many variations may be made by those skilled in the art without departing from the scope or spirit of the foregoing description.

What I claim as new and desire to secure by Letters Patent of the United States is:

1. A method for stabilizing an organic material susceptible to oxidative attack which comprises adding to the organic material an antioxidant having the general formula:

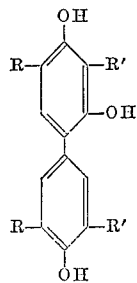

wherein R and R' are each monovalent hydrocarbon selected from the group consisting of alkyl and aryl radicals having up to 15 carbon atoms.

2. The process of claim 1 wherein the antioxidant comprises between 0.01–2.0 weight percent of the composition.

3. The process of claim 1 wherein the antioxidant is 3,3',5,5'-tetramethyl-2,4,4'-trihydroxybiphenyl.

4. The process of claim 1 wherein the antioxidant is 3,3',5,5'-tetraphenyl-2,4,4'-trihydroxybiphenyl.

5. The process of claim 1 wherein the antioxidant is 3,3',5,5'-tetra-tert-butyl-2,4,4'-trihydroxybiphenyl.

6. The process of claim 1 wherein the antioxidant is 3,3',5,5'-tetra-isopropyl-2,4,4'-trihydroxybiphenyl.

7. The process of claim 1 wherein the antioxidant is 3,3',5,5'-tetra-cyclo-hexyl-2,4,4'-trihydroxybiphenyl.

8. The process of claim 1 wherein the antioxidant is 3,3' - dimethyl - 5,5' - di-tert-butyl - 2,4,4' - trihydroxybiphenyl.

9. The process of claim 1 wherein the antioxidant is 3,3'-di-tert-butyl-5,5'-diphenyl-2,4,4'-trihydroxybiphenyl.

No references cited.

HENRY R. JILES, *Primary Examiner.*